Patented Aug. 2, 1949

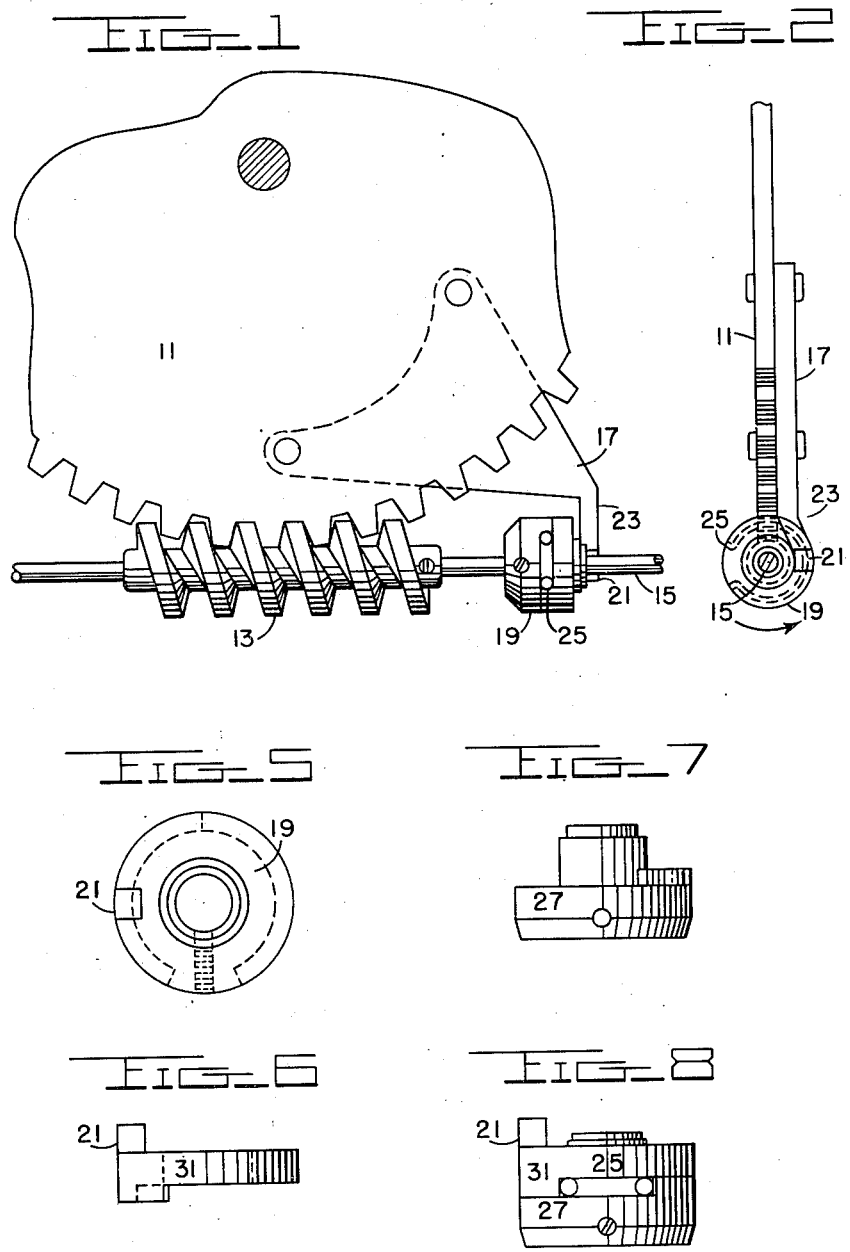

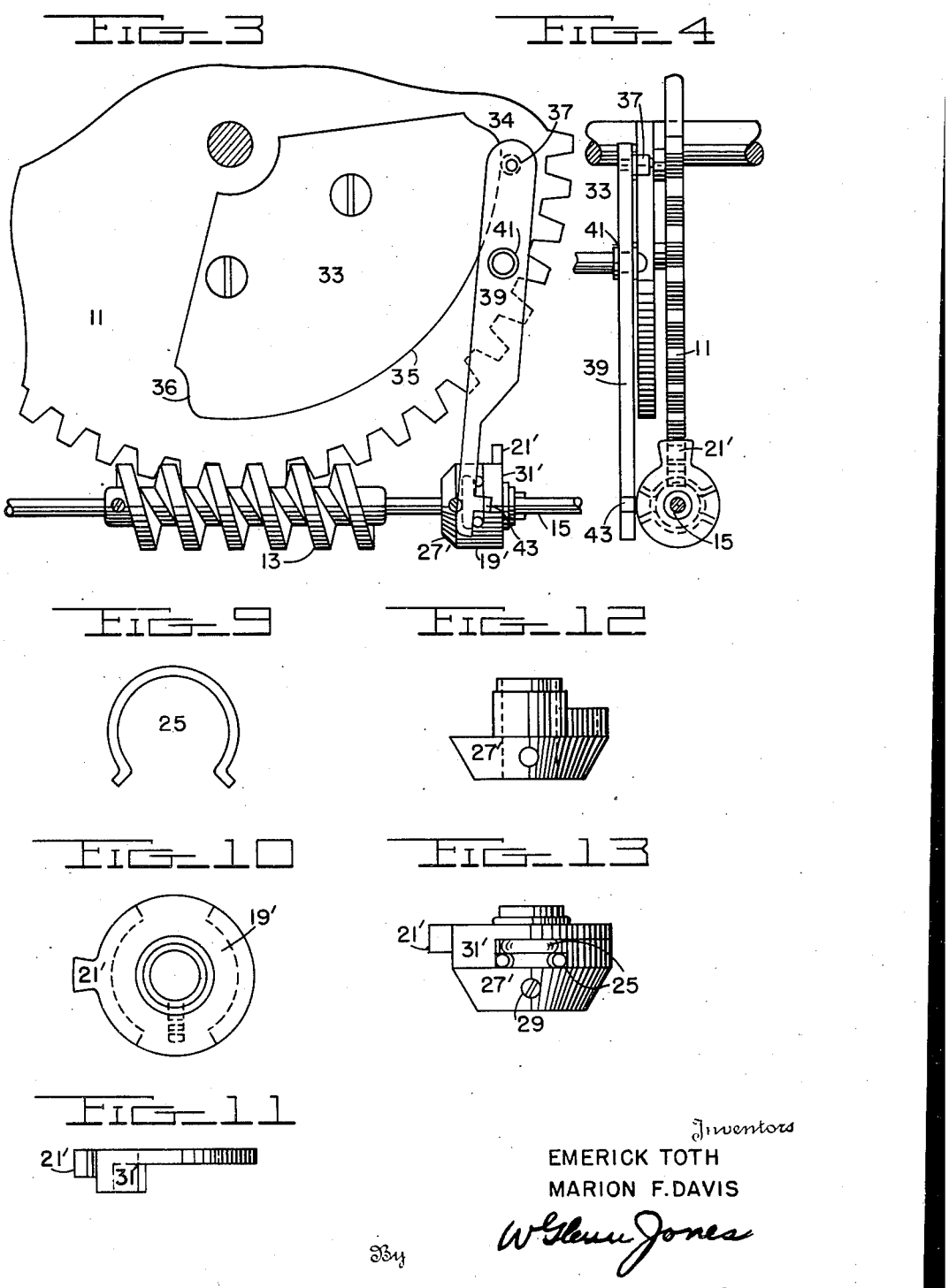

2,477,670

UNITED STATES PATENT OFFICE 2,477,670

CUSHIONED STOP FOR ROTARY MEMBERS

Emerick Toth, Cheverly, Md., and Marion F. Davis, Washington, D. C.

Application July 27, 1944, Serial No. 546,897

3 Claims. (Cl. 192—139)

(Granted under the act of March 3, 1883, as amended April 30, 1928; 370 O. G. 757)

This invention relates to limiting stops for use with hand operated gear driven devices. More particularly it relates to an arrangement for preventing shock upon the driven device or strain upon the intermediate gearing when the driven member arrives at its limiting position.

For the purpose of permitting micrometer control of the tuning elements of a radio apparatus, it is the custom to operate these elements by means of a chain of intermediate gearing so that a considerable rotation of the hand operated means will give a much smaller rotation of the driven device. Since the finally driven member may turn only a part of a revolution, whereas the driving member makes many revolutions, the limiting stops must operate as a function of the driven means. It has been the practice to apply the limit stops to the driven member in an obvious manner and this results in the elements arriving at the limiting position with a considerable shock. This tends to destroy the accurate adjustment of the adjustable element throughout its range and also in unnecessary strain on and wear of the intermediate gearing. Also the shock of the sudden stopping of the entire mass of the driven element and the connecting gearing tends to throw other elements of the device out of adjustment.

It is the principal object of this invention to provide means for limiting the motion of an element of a radio device without the ordinarily attendant shocks.

It is a further object of this invention to stop the tuning of a radio element without straining the intermediate gearing.

It is an ancillary object of this invention to provide means of the type described which may be installed readily in existing equipment without requiring extensive rearrangements of the various elements of the existing device.

These and other objects will become more apparent from the following specification taken in connection with the accompanying drawings.

In accomplishing the objects of this invention the driven member moves a projection of a stop member into the path of a dog which is resiliently mounted on and rotates with the hand operated driving member. This causes the latter to come to a snubbed stop in a fraction of a turn and thus gradually stops the driven member and the intermediate gearing consequently accomplishing the objects of the invention.

Having thus briefly described the invention, attention is invited to the accompanying drawings in which Fig. 1 is a partial schematic drawing showing one application of the invention.

Fig. 2 is an end view of the device as shown in Fig. 1;

Fig. 3 is a partial schematic vew of an application of an alternative form of the invention;

Fig. 4 is an end view of the device as shown in Fig. 3;

Fig. 5 is a plan view of one form of the snubber constituting part of the invention;

Figs. 6 and 7 are elevations showing component parts of the snubber shown in Fig. 5;

Fig. 8 is an assembly view of the elements shown in Figs. 5, 6 and 7;

Fig. 9 is a view of a spring for use in the snubber shown in Figs. 5 and 8 as well as for use in the snubber shown in Figs. 10 and 13;

Fig. 10 is a plan view of an alternative form of snubber;

Figs. 11 and 12 are elevations showing component parts of the snubber shown in Fig. 10; and, Fig. 13 is an assembly view of the elements shown in Figs. 10, 11, and 12.

Attention is now particularly invited to Figs. 1 and 2 of the drawings which show the basic invention. In these figures corresponding parts are similarly designated. In these drawings, the worm gear 11 is connected to the adjustable element, not shown, and is actuated to adjust said element by the worm 13, affixed to the hand actuated driving shaft 15. To the worm gear is affixed in any suitable manner the stop member 17, so positioned that when it is in the stop position as indicated the driven worm gear is in one of the desired limiting positions. A second stop member, not shown, is provided to stop the driven member at the other limit of its travel. When in the stop position, the projection 23 of the stop member 17 projects into the path of the dog 21 of the snubber 19. Continued rotation of shaft 15 is opposed by means of the spring 25 constituting part of the snubber 19.

The action of the snubber 19 will be more apparent upon consideration of Figs. 5, 6, 7, 8 and 9 to which attention is now invited. The snubber is composed of two main parts, part 21 being keyed or secured as shown or otherwise secured to the shaft 15 and the relatively movable part 31. The part 31 carries the dog 21 and is mounted on part 27 and is movable relative thereto against the pressure of spring 25.

Thus when the gear 11 has reached its limiting position the snubber 19 brings the hand operated shaft to a cushioned stop.

As previously indicated in order to obtain a similar action on turning the gear 11 to the other limiting position, it is necessary to duplicate the apparatus just described, providing a second snubber on the other side of the worm 13. However an alternative form of the device may be constructed, as will be now described, which will permit a single snubber to be used for both limits.

Such an arrangement is shown in Figs. 3 and 4 and in Figs. 10–13 to all of which attention is now invited. In all these figure parts corresponding to those which have been described are similarly designated.

In these figures, the worm gear is driven by the worm 13 secured to the hand operated shaft 15. A cam 33 is mounted spaced from the worm gear 11 as shown and so cut as to present a cam surface 35 to the roller 37, of the stop arm 39. The stop arm 39 is pivoted at 41 and has a stop projection 43 which will, when the gear 11 turns so that at either surface 34 or 36 is presented to the cam roller 37, engages the dog 21' the next time the shaft 15 is tuned to the right position. The snubber 19' is similar to snubber 19, but, as indicated, there is space for two springs 25 between the parts 27' and 31'. By this means the part 31' is resiliently coupled to part 27' for rotation in either direction, so that regardless of which way shaft 15 is being turned, it will be brought to a cushioned stop when the stop projection 43 engages the dog 21'.

The details of construction of the snubber 19' are clearly shown in Figs. 10, 11, 12 and 13. Part 27' is keyed or otherwise secured as by set screw 29 to the hand operated shaft and the part 31' is rotatably secured to part 27'. Two springs 25 enclosed in the annular space between parts 31' and 27' one to maintain the spaced relationship between the parts on each side thereof.

The arrangement just described operates as follows. Assuming that the shaft is being turned in the counter-clockwise direction looking from the right end thereof as shown in Fig. 3, the gear 11 as shown in the figure will be rotated in a clockwise direction. When 11 has rotated a sufficient distance, the roller 37 will go off of surface 35 onto surface 34 throwing projection 43 into the path of dog 21'. When 21' and 43 contact the portion 31' will be held stationary and further rotation of 15 will be against the spring pressure of one of the springs 25. Thus the shaft 15 and gear 11 will be brought to a cushioned stop.

An exactly similar action is obtained when the drive shaft 15 is tuned in the opposite clockwise direction and the roller 37 goes off the surface 35 onto the surface 36. Then the projection 43 will be moved into the path of dog 21 and will, through the snubber, bring the shaft to a cushioned stop.

It is apparent that various modifications may be made in the devices shown and described for the purposes of illustration and that this invention is not limited to the specific devices shown but rather to the actual scope of the invention as defined in the following claims.

The invention described herein may be manufactured and used by or for the Government of the United States of America for governmental purposes without the payment of any royalties thereon or therefor.

We claim:

1. A snubber for stopping a driven device when said device has reached a predetermined limit of operation, said snubber comprising a first element mounted on a driving shaft for said device, said element including a central core portion, a disc portion attached to one end of said core, a bore through said core for the reception of the said shaft, a set screw operable to secure said element to the shaft, and a substantially semicircular flange portion spaced from said core; a second disc shaped element having a hole therethrough to fit the core portion of said first element, a substantially semicircular flange portion on the side of said second element toward said first element whereby there is defined between said two elements an annular space, a dog on the opposite side of said second element, a horseshoe shaped spring in the annular space thus provided, arranged with its ends interposed between one pair of adjacent ends of said flanges to hold the other pair of adjacent ends of the flanges normally in abutment, and a stop element carried directly by said device for movement into the path of the dog upon movement of the device to the limit of its operation, whereby when said driven device reaches the limit of its operation and the stop actuated by said device moves into the path of said dog, continued operation of said driving shaft will be opposed by the increasing pressure of said spring as the said dog is held stationary by said stop.

2. In a snubber device of the type described, a first element including a central core portion, a disc portion attached to one end of the said core, a bore through the center of said core for the reception of a shaft and a substantially semicircular flange portion spaced from said core, a second disc-shaped element having a hole therethrough to fit the core portion of said first element, upon which said element is mounted, a substantially semicircular flange portion on the side of said second element toward said first element, whereby there is defined between said two elements an annular space, a dog on said second element, and a horseshoe shaped spring in the annular space thus provided, arranged with its ends interposed between one pair of adjacent ends of said flanges to hold the other pair of adjacent ends of the flanges in abutment.

3. A snubber for stopping a driven device when said device has reached a predetermined limit of operation, said snubber comprising a first element mounted on a driving shaft for said device, said element including a central core portion, a disc portion attached to one end of said core, a bore through said core for the reception of said shaft, a set screw operable to secure the said element to said shaft, and a substantially semicircular flange portion spaced from said core, a second disc-shaped element having a hole therethrough for mounting said element coaxial with and rotatable relative to said first element, a substantially semicircular flange portion on the side of said second element toward said first element whereby there is defined between said two elements an annular space, a dog on said second element; and a horseshoe shaped spring in the annular space thus provided for maintaining said two elements in a desired angular relationship, and a stop element carried directly by the device for movement into the path of the dog upon movement of the device to the limit of its operation, whereby when said driven device reaches the limit of its operation and the stop is moved into the path of said dog, continued operation of said shaft will be opposed by the increasing pressure of said spring as said dog is held stationary by said stop.

EMERICK TOTH.
MARION F. DAVIS.

REFERENCES CITED

The following references are of record in the file of this patent:

UNITED STATES PATENTS

| Number | Name | Date |
|---|---|---|
| 701,872 | Giacomini | June 10, 1902 |
| 870,106 | Jones | Nov. 5, 1907 |
| 1,648,554 | Lundin et al. | Nov. 8, 1927 |
| 1,712,901 | Paris | May 14, 1929 |
| 1,841,255 | Rybeck | Jan. 12, 1932 |
| 1,850,260 | Daly | Mar. 22, 1932 |
| 1,964,081 | Rausch | June 26, 1934 |
| 2,091,570 | Ritzerfeld | Aug. 31, 1937 |
| 2,167,474 | Chudner | July 25, 1939 |
| 2,182,733 | Minkow | Dec. 5, 1939 |
| 2,309,152 | Woodruff et al. | Jan. 26, 1943 |
| 2,330,076 | Ochsenbein | Sept. 21, 1943 |
| 2,398,841 | Morris | Apr. 23, 1946 |

FOREIGN PATENTS

| Number | Country | Date |
|---|---|---|
| 831,898 | France | Sept. 15, 1938 |